United States Patent [19]

Kawabata et al.

[11] 4,048,904
[45] Sept. 20, 1977

[54] SERVO VALVE DEVICE IN POWER STEERING APPARATUS

[75] Inventors: Minoru Kawabata, Chita; Kenji Takahashi, Kariya, both of Japan

[73] Assignee: Toyoda-Koki Kabushiki-Kaisha, Japan

[21] Appl. No.: 685,259

[22] Filed: May 11, 1976

[30] Foreign Application Priority Data

May 30, 1975  Japan .................................. 50-65709

[51] Int. Cl.² .............................................. F15B 9/10
[52] U.S. Cl. ..................................... 91/375 A; 91/372
[58] Field of Search ................. 91/370, 371, 372, 373, 91/375 A, 434, 375 R

[56] References Cited

U.S. PATENT DOCUMENTS

| | | | |
|---|---|---|---|
| 3,408,900 | 11/1968 | Tomita | 91/372 |
| 3,657,967 | 4/1972 | Suzuki | 91/375 A |
| 3,817,151 | 6/1974 | Kawabata | 91/375 A |

FOREIGN PATENT DOCUMENTS 1,291,225   3/1969   Germany ........................... 91/375 A

*Primary Examiner*—Paul E. Maslousky
*Attorney, Agent, or Firm*—Oblon, Fisher, Spivak, McClelland & Maier

[57] ABSTRACT

A servo valve device in a power steering apparatus of a vehicle, which has a main valve member provided with two valve chambers and disposed to rotate in response to one of the action of a fluid pressure motor supplementing manual steering torque and a manual steering torque, and which has two flap valve members respectively located in the two valve chambers and disposed to rotate in response to the other of the action of the fluid pressure motor and the manual steering torque for controlling fluid under pressure for the fluid pressure motor. The two valve chambers are formed by fluid-tightly partitioning an axial slot formed within the main valve member at a plane containing the rotational axis thereof, and the two flap valve members are integrally formed with each other.

6 Claims, 5 Drawing Figures

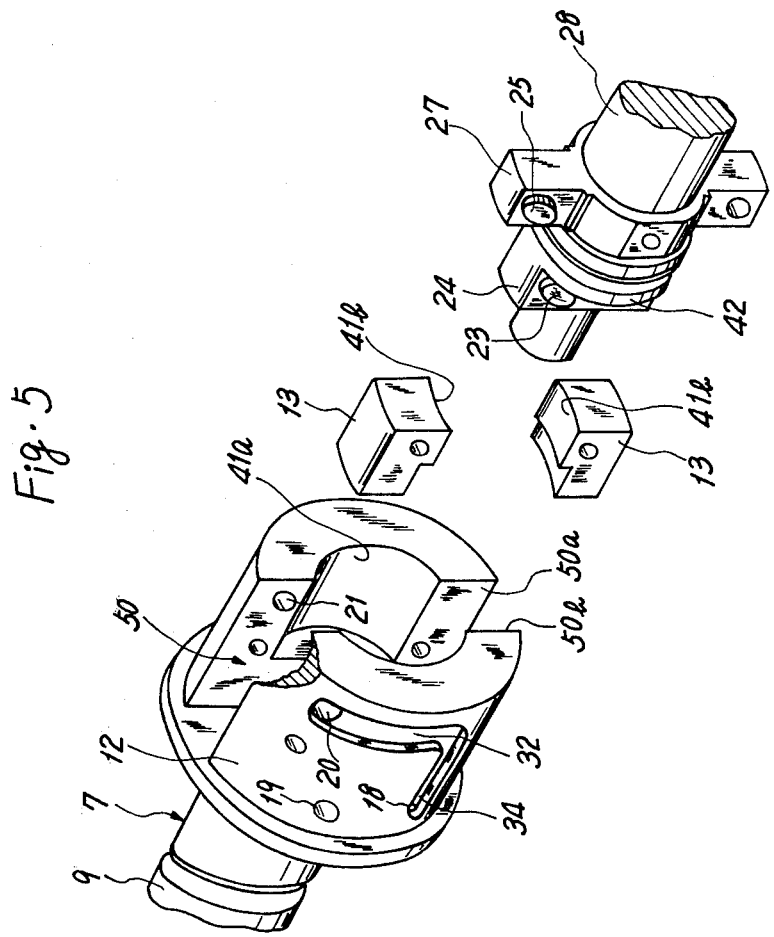

4,048,904

SERVO VALVE DEVICE IN POWER STEERING APPARATUS

BACKGROUND OF THE INVENTION

1. Field of the Invention

The present invention relates generally to a servo valve device in a power steering apparatus used on a vehicle, and more particularly to a servo valve device provided with two flap valve members for controlling a fluid pressure motor in the power steering apparatus.

2. Description of the Prior Art

A servo valve device of the above type which is in current use is composed of a main valve member which is disposed to rotate in response to the action of the fluid pressure motor supplementing manual steering torque and which is provided with first and second valve chambers respectively connected to fluid supply and exhaust lines, and first and second flap valve members respectively disposed in the first and second valve chambers for rotating in response to the manual steering torque to control fluid under pressure for the fluid pressure motor. The main valve member is also provided with a pair of distribution ports opened at opposing walls in the first valve chamber and respectively communicating with operative ports of the fluid pressure motor for supply of fluid under pressure, and with a pair of injection ports opened at opposing walls in the second valve chamber and respectively communicating with the operative ports of the fluid pressure motor for exhausting the fluid.

In such a servo valve device, the two valve chambers are respectively formed within the main valve member by machinings, such as millings or grindings, given separately from each other, to be axially spaced. For that reason, it is very difficult to finish the two valve chambers in ideal size, form and position relative to each other in such a manner that gaps between both sides of the first flap valve member and both side walls of the first valve chamber and gaps between both sides of the second flap valve member and both side walls of the second valve chamber have a predetermined ideal relation to each other under a normal condition. Accordingly, it is very difficult for such a servo valve device to achieve ideal fluid control.

Moreover, generally, such two valve chambers are respectively formed from opposite ends of the main valve member. For that purpose, nothing can be integrally formed with the opposite ends of the main valve member, for example, a first steering rod for connecting the main valve member to the fluid pressure motor cannot be integrally formed with the main valve member. Accordingly, it is very difficult to exactly align the main valve member with the first steering rod, and the component parts of the servo valve device are thus inevitably increased in number.

SUMMARY OF THE INVENTION

Accordingly, it is an object of the present invention to provide an improved servo valve device in a power steering apparatus.

Another object of the present invention is to provide an improved servo valve device which achieves ideal fluid control for a fluid pressure motor in a power steering apparatus.

Another object of this invention is to provide a servo valve device whose assembly accuracy is improved.

A further object of the present invention is to provide an improved servo valve device, having a minimum number of component parts.

A still further object of the present invention is to provide an improved servo valve device having two valve chambers which can be formed with precision as required.

According to the present invention, the foregoing and other objects are attained by the provision of a servo valve device in the power steering apparatus, which has a main valve member provided with two valve chambers formed by fluid-tightly partitioning an axial slot formed therewithin at a plane containing the rotational axis thereof, and which has two flap valve members formed integrally with each other and respectively located in the two valve chambers.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 5 shows a perspective development of a servo valve device of the power steering apparatus shown in FIG. 1.

DETAILED DESCRIPTION OF THE PREFERRED EMBODIMENT

Figure 1:
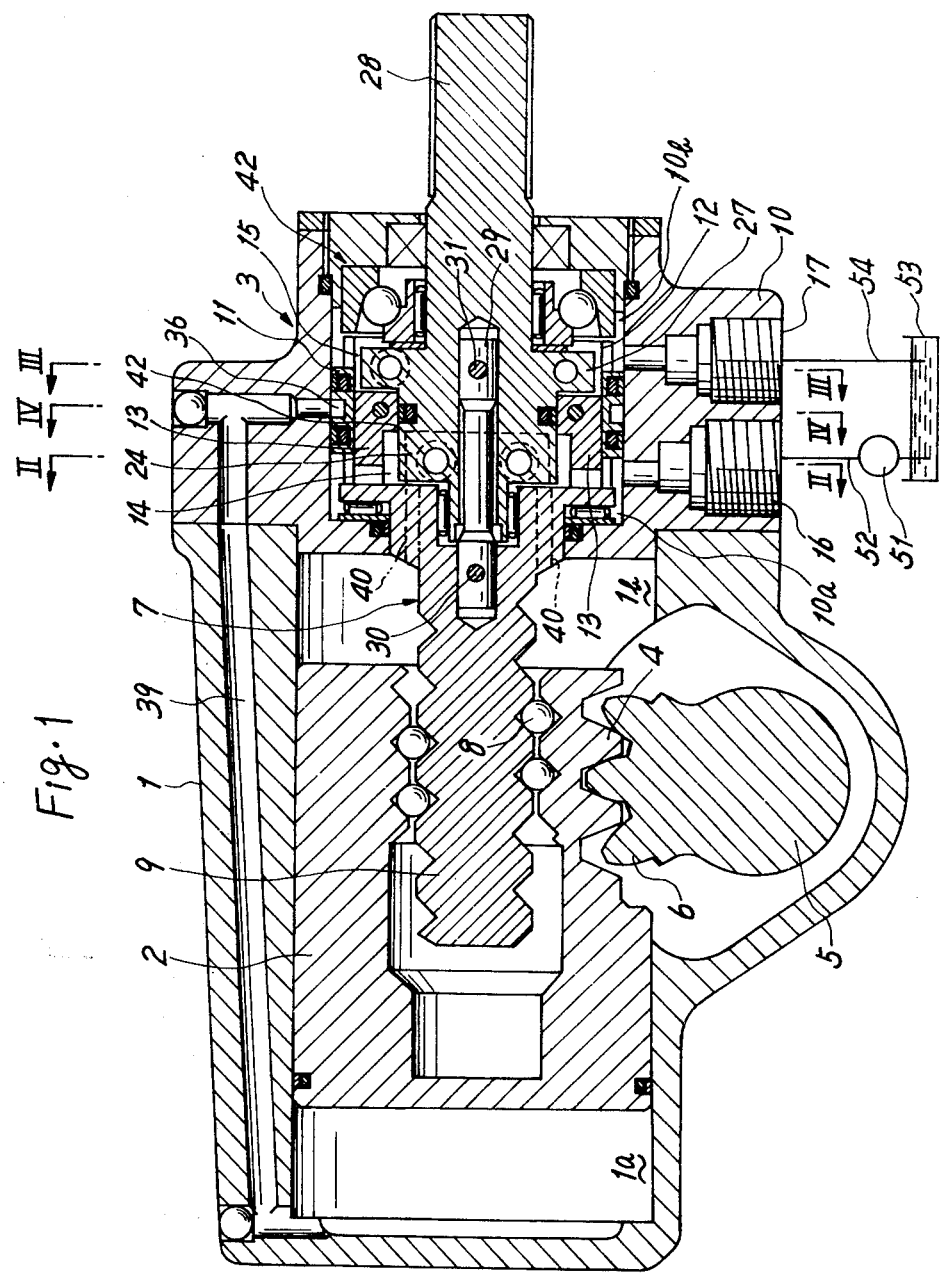
FIG. 1 is a longitudinal sectional view of a power steering apparatus according to the present invention.

Referring now to the drawings, wherein like reference characters refer to identical or corresponding parts throughout the several views, and more particularly to FIG. 1, there is shown one example of a power steering apparatus formed according to the present invention. The power steering apparatus is provided with, at one side, a fluid pressure cylinder 1 slidably containing a piston 2 for supplementing manual steering torque and, at the other side, a valve housing 10 rotatably containing a servo valve device 3 for controlling fluid under pressure supplied to the fluid pressure cylinder 1. Fluid chambers 1a and 1b are formed within the cylinder 1 on opposite sides of the piston 2. A rack 4 formed on a part of the periphery of the piston 2 is meshed with a sector gear 6 on a cross shaft 5 which, in turn, is connected through a link mechanism, not shown, to dirigible wheels of a vehicle. Rotatably and fluid-tightly supported by the valve housing 10 is a first rotatable steering rod 7 which is formed at its one end with a screw shaft 9 threadedly engaged with a threaded bore of the piston 2 through a plurality of balls 8 and its other end with a main valve member 12 housed in the valve housing 10.

Figure 4:
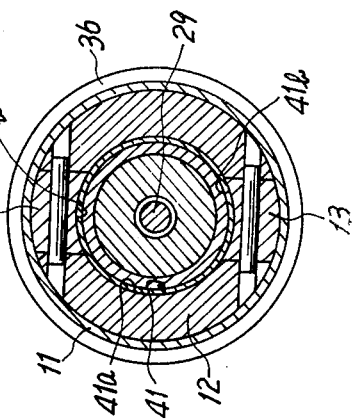
FIG. 4 is a sectional view of the apparatus taken along the line IV—IV of FIG. 1.

The main valve member 12 has formed at a plane containing the rotational axis thereof an axial slot 50 extending from one open axial end thereof toward the other closed axial end and having a pair of opposed parallel walls 50a and 50b, as shown best in FIG. 5. The slot 50 is fluid-tightly partitioned into at least two axial slots so as to respectively define a first valve chamber 14 and a second valve chamber 15 axially spaced from each other by a pair of partition members 13 tightly housed therein. The main valve member 12 is tightly fitted into a sleeve valve member 11 rotatably fitted within the valve housing 10 for fluid-tightly partitioning the valve housing 10 into a first housing chamber 10a communicating with the first valve chamber 14 and a second housing chamber 10b communicating with the second valve chamber 15. The first housing chamber 10a is communicated with an inlet port 16 connected with the delivery of a fluid pressure pump 51 through a supply pipe 52 so as to be supplied with fluid under pressure, and the second housing chamber 10b is communicated with an outlet port 17 leading to a reservoir 53 through an exhaust pipe 54 so as to return fluid to the reservoir 53. Moreover, the main valve member 12 has formed at the rotational axis thereof an inner bore 41a which completes a perfect circular bore 41 in cooperation with inner circular arc surfaces 41b of the partition members 13, as best shown in FIG. 4.

At the opposite side of the first steering rod 7, rotatably and fluid-tightly supported by the valve housing 10, is a manually rotatable second steering rod 28, which is disposed to align with the first steering rod 7. One end of the second steering rod 28 is extended out of the valve housing 10 and is connected through suitable coupling members with a steering handle or wheel, not shown, so as to be rotated or turned by the driver or operator of the vehicle. The other end of the second steering rod 28 is extended into the main valve member 12 and is resiliently connected to the first steering rod 7 by a torsion bar 29 which is fixed at its opposite ends to the first and second steering rods 7 and 28 at the rotational axis thereof by pins 30 and 31, respectively.

The second steering rod 28 has integrally formed therewith a cylindrical portion 42 which is rotatably and fluid-tightly fitted within the circular bore 41 so as to prevent communication of fluid under pressure between the valve chambers 14 and 15.

Moreover, the second steering rod 28 has, on both sides of the cylindrical portion 42 and integrally formed therewith, first and second flap valve members 24 and 27, which are respectively located in the first and second valve chambers 14 and 15 and which are extended in the same radial direction with the same thickness so as to be positioned at a central position between the walls 50a and 50b of the valve chambers under a normal or neutral condition of the torsion bar 29.

The first flap valve member 24 is formed with a shorter radius than that of the second flap valve member 27 so as to produce a proper steering reaction upon operation of the power steering apparatus, as will hereinafter be made apparent. The first flap valve member 24 is provided with two pairs of projecting valve seats 22 and 23 on the opposite sides of both ends thereof so that predetermined equal gaps are respectively maintained between each of the valve seats 22 and 23 and each of the walls 50a and 50b of the first chamber 14 under the normal condition of the torsion bar 29. The second flap valve member 27 is provided with a pair of projecting valve seats 25 and 26 on the opposite sides of one end thereof so that predetermined equal gaps are respectively maintained between each of the valve seats 25 and 26 and each of the walls 50b and 50a of the second valve chamber 15 under the normal condition of the torsion bar 29. As shown best in FIG. 2, two pairs of first and second distribution ports 18 and 19, which are formed in the main valve member 12, are respectively opened opposite the two pairs of valve seats 22 and 23 at both side walls 50a and 50b in the first valve chamber 14. As shown best in FIG. 3, a pair of first and second injection ports 20 and 21, which are formed in the main valve member 12, are respectively opened opposite the pair of valve seats 25 and 26 at both side walls 50a and 50b in the second valve chamber 15.

The fluid passage communication of the servo valve device 3 with the fluid pressure cylinder 1 is as follows. As shown best in FIGS. 2, 3 and 5, in the periphery of the main valve member 12, tightly fitted into the sleeve valve member 11, there are formed a pair of arcuate recesses 32 and 33 respectively communicating with the injection ports 20 and 21, a pair of axial recesses 34 and 35 respectively communicating the arcuate recesses 32 and 33 with one of the first and one of the second distribution ports 18 and 19, and an axial recess 34' communicating with the other of the first distribution ports 18. In the periphery of the sleeve valve member 11 there is formed an annular recess 36 communicating with the axial recesses 34 and 34', respectively, through fluid passages 37 and 38, and the annular recess 36 is communicated with the fluid chamber 1a of the fluid pressure cylinder 1 through a longitudinal passage 39 formed in the valve housing 10 and the fluid pressure cylinder 1. On the other hand, the pair of second distribution ports 19 are respectively communicated with the fluid chamber 1b of the fluid pressure cylinder 1 through fluid passages 40 formed in the main valve member 12 or first steering rod 7, as shown in FIGS. 1, 2 and 5.

Operation of the present embodiment is hereinafter described.

Figure 3:
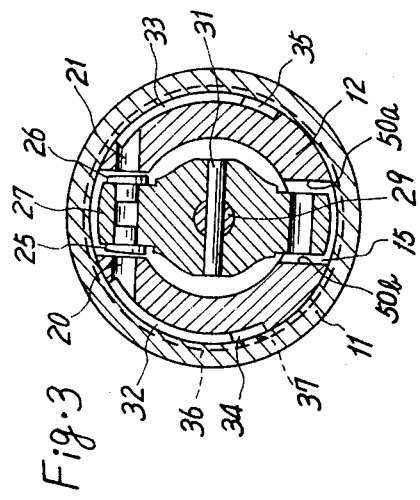
FIG. 3 is a sectional view of the apparatus taken along the line III—III of FIG. 1.
Figure 2:
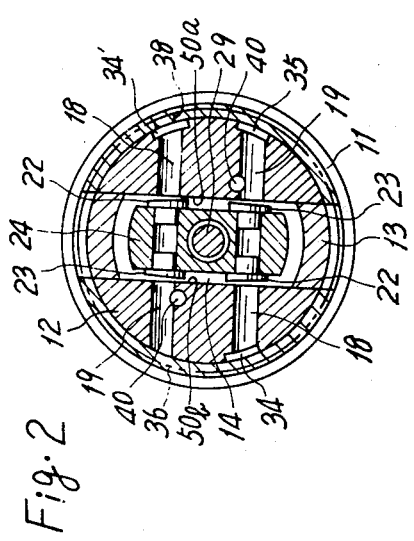
FIG. 2 is a sectional view of the apparatus taken along the line II—II of FIG. 1.

When the steering handle or the second steering rod 28 is positioned at its neutral position, the first and second flap valve members 24 and 27 are both positioned in a center-plane of the first and second valve chambers 14 and 15, as shown in FIGS. 2 and 3, so that the flow resistance at each of the distribution ports 18 and 19 is equal and the flow resistance at each of the injection ports 20 and 21 is equal. Accordingly, fluid under pressure in the first valve chamber 14 supplied from the inlet port 16 is distributed equally into each of the distribution ports 18 and 19 and is discharged from the injection ports 20 and 21 to the second valve chamber 15 and, in turn, to the outlet port 17, and fluid pressure produced in each of the fluid chambers 1a and 1b of the fluid pressure cylinder 1 is equally balanced, whereby the piston 2 remains stationary.

When the second steering rod 28 is turned clockwise, as viewed in FIG. 2, the torsion bar 29 is twisted because of the resistance force between the steered wheels and the road which acts on the first steering rod 7, whereby the second steering rod 28 is turned in a clockwise direction relative to the first steering rod 7, and namely relative to the main valve member 12. Accordingly, the first and second flap valve members 24 and 27 are turned clockwise relative to the first and second valve chambers 14 and 15, as viewed in FIGS. 2 and 3, so that the pair of first distribution ports 18 and the second injection port 21 tend to be simultaneously closed by the valve seats 22 and 26 and the pair of second distribution ports 19 and the first injection port 20 tend to be completely opened by the valve seats 23 and 25. Therefore, the greater part of the fluid under pressure in the first valve chamber 14 supplied from the inlet port 16 is distributed to the pair of second distribution ports 19, and is mostly supplied to the right fluid chamber 1b of the fluid pressure cylinder 1 through the fluid passages 40 because the fluid stream to be discharged from the second injection port 21 to the second valve chamber 15 is now restricted by the valve seat 26. Accordingly, the fluid pressure in the right fluid chamber 1b of the fluid pressure cylinder 1 is increased so that the piston 2 is displaced leftward to effect a right turn of the steered wheels. On the other hand, the fluid stream to be exhausted from the left fluid chamber 1a of the fluid pressure cylinder 1 is led to the second valve chamber 15 through the open first injection port 20.

Thus, a small steering torque given by the operator is amplified through the fluid pressure cylinder 1, whereby the operator can easily and lightly deflect the steered wheels to the right. In this operation, the fluid pressure in the right fluid chamber 1b of the fluid pressure cylinder 1 acts, on the one hand, on the valve seat 26 through the second injection port 21 to turn the second flap valve member 27 counterclockwise and, on the other hand, on the valve seat 23 through the second distribution ports 19 to turn the first flap valve member 24 clockwise. Consequently, a counterclockwise moment of force under the differential radius between the first and second flap valve members 24 and 27 is produced on the second steering rod 28 as a steering reaction which acts to turn the second steering rod 28 in a direction opposite to the steering torque by the operator. Accordingly, the operator can feel the steering reaction in response to a deflected angle of the steered wheels.

When the second steering rod 28 is conversely turned counterclockwise as viewed in FIG. 2, the second steering rod 28 is turned in a counterclockwise direction relative to the first steering rod 7, and the pair of second distribution ports 19 and first injection port 20 tend to be simultaneously closed by the valve seats 23 and 25, and the pair of first distribution ports 18 and the second injection port 21 tend to be completely opened by the valve seats 22 and 26. Therefore, the fluid pressure cylinder 1 is activated to effect a left turn of the steered wheels. Such operation of the apparatus can be easily deduced from the operation hereinbefore explained, and therefore further explanation beyond that already provided is not deemed necessary.

As hereinbefore explained, the first and second valve chambers 14 and 15 in the main valve member 12 are formed by fluid-tightly partitioning only one axial slot formed at a stroke at a plane containing a rotational axis of the main valve member 12, whereby the one side wall 50a of the first valve chamber 14 and the same side wall 50a of the second valve chamber 15 are exactly formed in the same plane, and the other side wall 50b of the first valve chamber 14 and the same side wall 50b of the second valve chamber 15 are exactly formed in the same plane. Moreover, the first and second flap valve members 24 and 27 are formed integrally, are extended radially in the same radial direction, and are formed into flat shapes with equal thickness. Accordingly, the accuracy of assemblage of the main valve member 12 and the first and second flap valve members 24 and 27 is improved so that contact of the valve seats 22 with the walls 50a and 50b of the first valve chamber 14 coincide exactly with contact of the valve seat 26 with the wall 50a of the second valve chamber 15, and contact of the valve seats 23 with the walls 50a and 50b of the first valve chamber 14 coincide exactly with contact of the valve seat 25 with the wall 50b of the second valve chamber 15, and that a superior fluid control is thereby achieved.

Moreover, because the axial slot 50 is capable of being formed by a cutting operation from only one side, with respect to an axial direction, the main valve member 12 may be integrally formed with the screw shaft 9. Accordingly, an alignment between the main valve member 12 and the screw shaft 9 is exactly achieved with easiness, and it is possible to decrease the number of component parts of the servo valve device.

Obviously, many modifications and variations of the present invention are possible in light of these teachings. It is therefore to be understood that within the scope of the appended claims, the invention may be practiced otherwise than as specifically described herein.

What is claimed as new and desired to be secured by Letters Patent of the United States is:

1. In a power steering apparatus having a fluid pressure motor supplementing manual steering torque, a first rotatable steering rod member rotating in response to the action of said fluid pressure motor, a manually rotatable second steering rod member aligned with said first steering rod member, and a servo valve device serving to distribute fluid under pressure to said fluid pressure motor in response to rotational phase difference between said first steering rod member and said second steering rod member due to manual steering torque, said servo valve device comprising:

a main valve member mounted on one of said two steering rod members nd having an axial slot extending from one open axial end thereof toward a closed axial end in a plane containing a rotational axis thereof;

partition means housed in said axial slot and separably fixed to said main valve member for fluid-tightly partitioning said axial slot into at least two axially spaced slots so as to respectively define a first valve chamber and a second valve chamber being axially spaced apart, said first valve chamber being connected to a fluid supply line and being provided with a pair of distribution ports, one of which communicates with one of the operative ports of said fluid pressure motor and the other of which communicates with the other of said operative ports of said fluid pressure motor, said second valve chamber being connected to a fluid exhaust line and being provided with a pair of injection ports, one of which communicates with said one of said distribution ports and the other of which communicates with said other of said distribution ports;

a radially extending first flap valve member mounted on the other of said two steering rod members and located in said first valve chamber for controlling flow of said fluid being supplied under pressure to said two distribution ports; and a radially extending second flap valve member integrally formed with said first flap valve member and located in said second valve chamber for controlling flow of said fluid under pressure from said two injection ports.

2. A power steering apparatus as claimed in claim 1, further comprising a valve housing aligned with said first steering rod member for rotatably containing said servo valve device.

3. A power steering apparatus as claimed in claim 2, wherein said axial slot opens at diametrically opposed sides of said main valve member.

4. A power steering apparatus as claimed in claim 3, wherein said servo valve device further comprises a sleeve valve member fluid-tightly fitted to the periphery of the main valve member and rotatably and fluid-tightly mounted within said valve housing so as to cover the diametrical opposite ends of said axial slot for fluid-tightly partitioning said axial slot into said two valve chambers.

5. A power steering apparatus as claimed in claim 1, further comprising a cylindrical portion integrally formed with and disposed between said two flap valve members and being rotatably and fluid-tightly fitted to said partition means.

6. A power steering apparatus as claimed in claim 5, wherein:
   said main valve member is integrally formed with said one of said two steering rod members;
   said first valve chamber is positioned on the adjacent side to said one of said two steering rod members relative to said second valve chamber; and
   said second flap valve member is formed with a radius longer than that of said first flap valve member.

* * * * *